United States Patent [19]
Klingler

[11] 3,892,868
[45] July 1, 1975

[54] PIZZA PIE AND METHOD OF FORMING THE SAME

[76] Inventor: Josef F. Klingler, 1335 Gregory, Wilmette, Ill. 60091

[22] Filed: Apr. 27, 1973

[21] Appl. No.: 355,056

[52] U.S. Cl. .................. 426/94; 426/499; 426/514
[51] Int. Cl. ...................... A21d 13/00; A23g 3/00
[58] Field of Search ......... 426/89, 98, 94, 143, 496, 426/499, 502, 503, 512, 514, 289, 302, 152

[56] References Cited
UNITED STATES PATENTS

| | | | |
|---|---|---|---|
| 1,663,719 | 3/1928 | Morley | 426/499 X |
| 2,072,793 | 3/1937 | Brennan | 426/503 X |
| 2,263,490 | 11/1941 | Fox | 426/499 |
| 2,365,349 | 12/1944 | MacManus | 426/289 X |
| 2,734,464 | 2/1956 | Hallock et al. | 426/502 |
| 2,774,316 | 12/1956 | Daino | 426/496 X |
| 2,879,163 | 3/1959 | Anson et al. | 426/289 |
| 3,765,909 | 10/1973 | Moline | 426/503 X |

OTHER PUBLICATIONS

Strause, "Pie Marches On", Ahrens Book Co. Inc., New York, 1963, pages 116 and 118.

*Primary Examiner*—Raymond N. Jones
*Attorney, Agent, or Firm*—Wegner, Stellman, McCord, Wiles & Wood

[57] ABSTRACT

A pizza pie having an annular dough portion defining radially inner and outer crust portions. The pie may comprise a single such means or selectively a plurality of concentrically arranged such means defining selectively different size pizza pies. Each such means is adapted to be cut into wedge-shaped individual pie sections having radially inner and outer crust portions.

10 Claims, 13 Drawing Figures

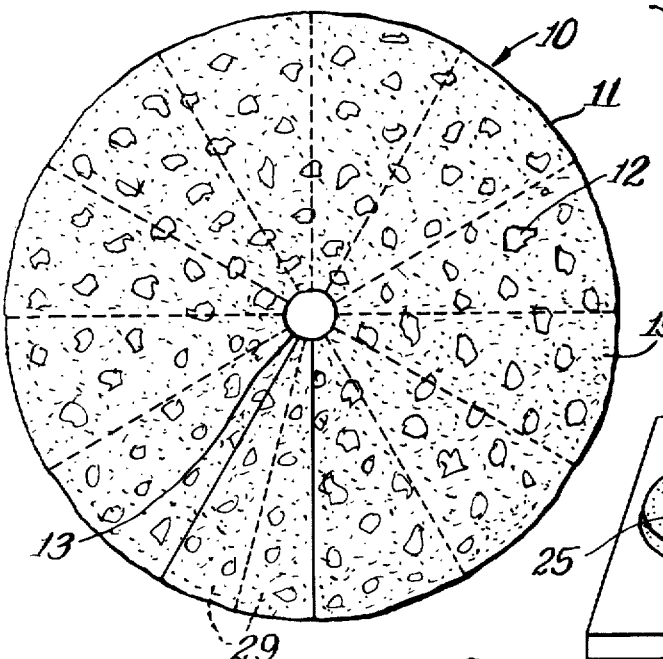
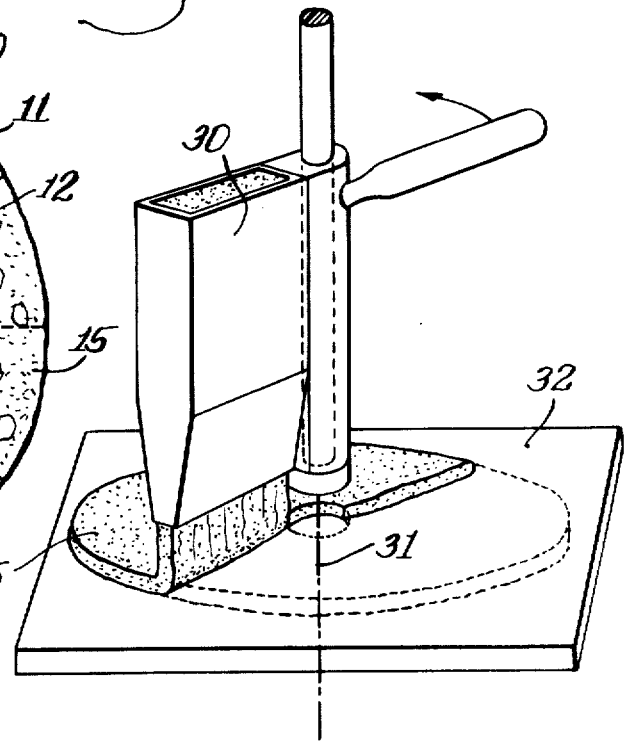
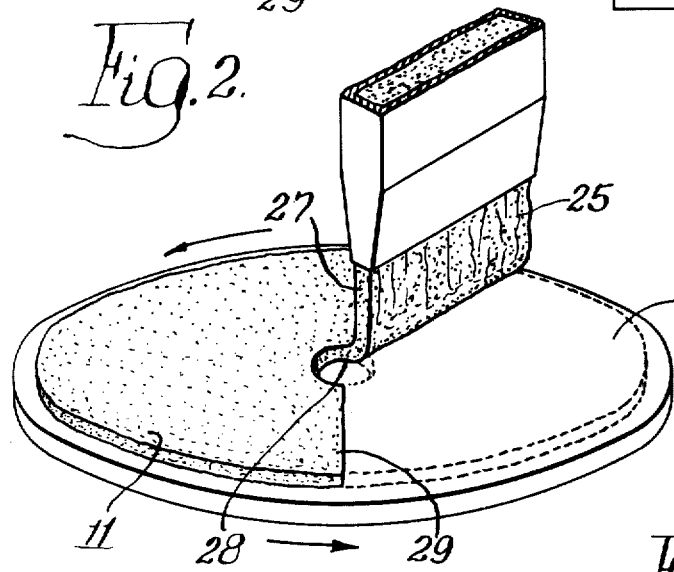
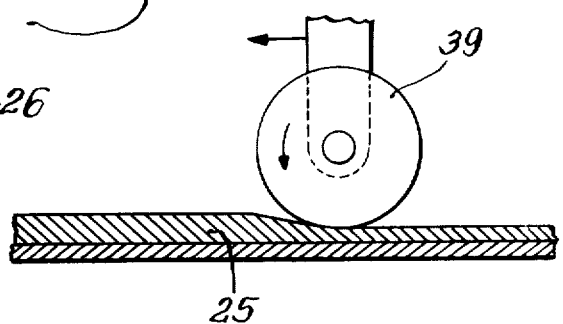
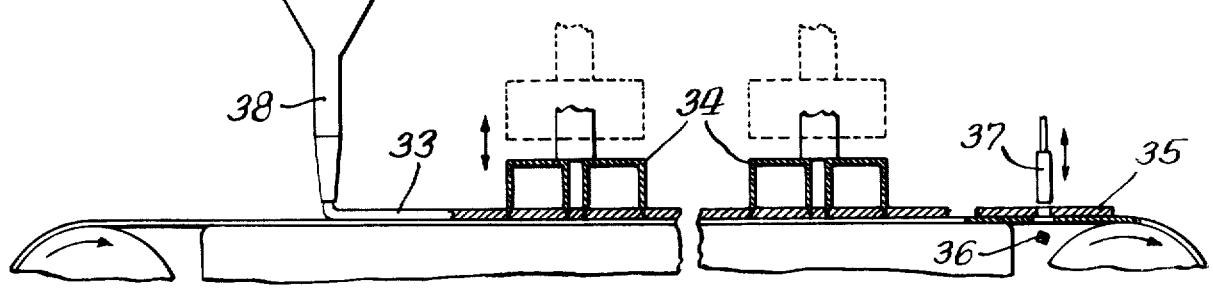

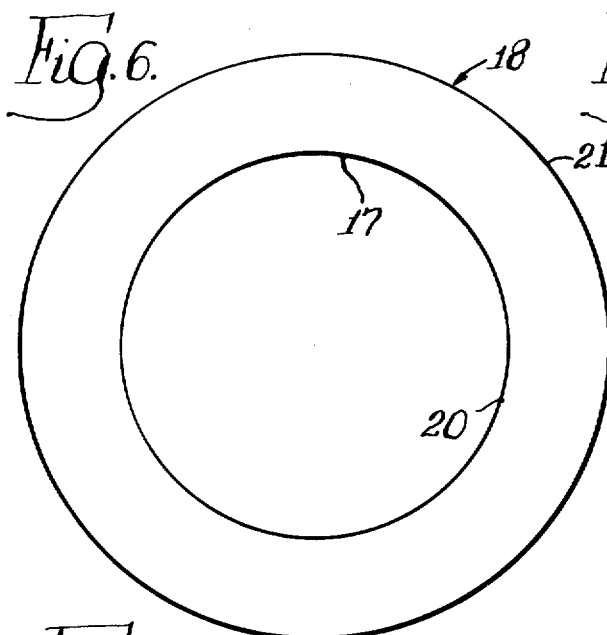
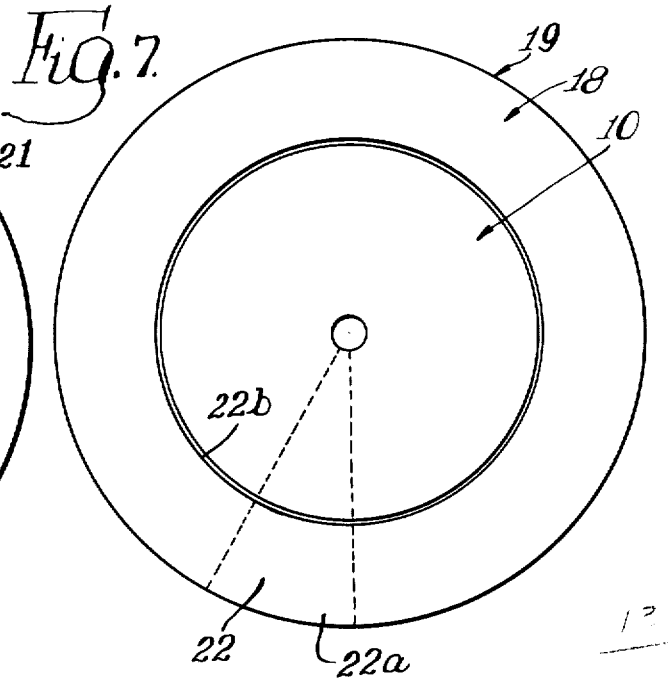
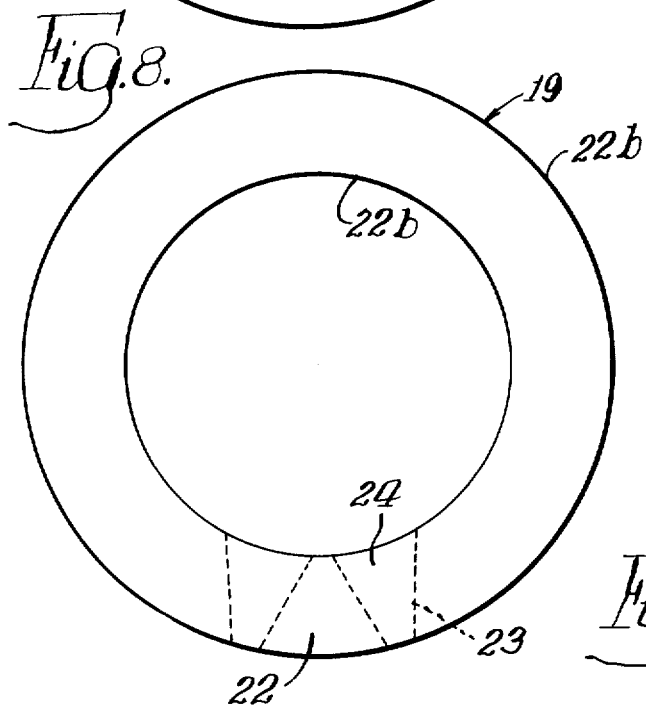
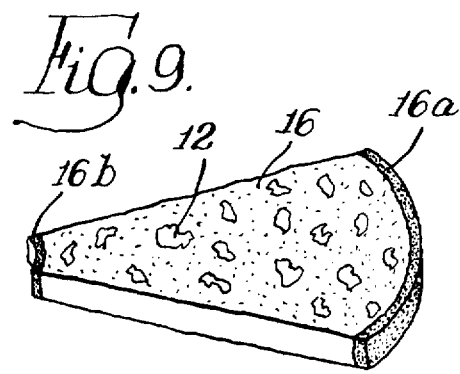
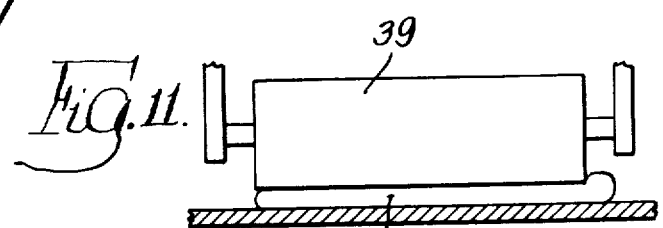
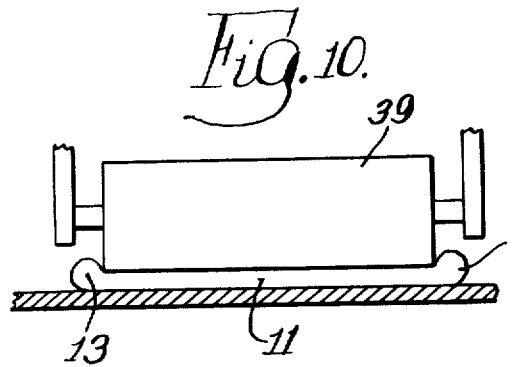
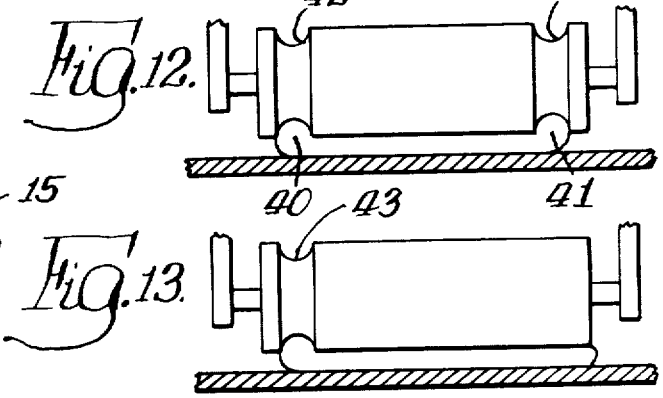
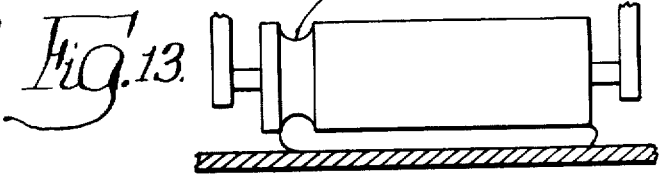

3,892,868

PIZZA PIE AND METHOD OF FORMING THE SAME

BACKGROUND OF THE INVENTION

1. Field of the Invention

This invention relates to pizza pies.

2. Description of the Prior Art

The conventional pizza pie comprises a circular pie having a base dough portion which conventionally comprises a form of bread dough. Suitable topping materials are placed on the dough portion as desired, such topping materials conventionally including cheese, green peppers, anchovies, etc. The pie is baked in a suitable oven. In this process, the dough portion is caused to define a baked outer edge crust portion extending about the circumference of the pie. The midportion of the pie conventionally does not bake as fast as the edge portion.

The completed pizza pie is conventionally cut into portions by use of a conventional wheel knife cutter. As only the circumferential edge of the pie defines an edge crust portion, the cut portions have, at the most, one edge defined by a crust portion.

In commercial pizzerias, such pizza pies are conventionally baked to order so that a delay in the serving of the pizza pie ordinarily results.

SUMMARY OF THE INVENTION

The present invention comprehends an improved pizza pie and method of forming a pizza pie wherein an annular arrangement of the pie is provided so as to provide at least two edge crust portions in each of the cut pieces for facilitated handling and improved quality.

The pizza pie of the present invention further provides an improved rapid baking by eliminating the normally difficult-to-bake center portion of the pie. Thus, the waiting time is reduced.

The annular arrangement of the pizza pie permits the forming of different size pies by utilization of different diameter pies concentrically disposed. Thus, illustratively, the smallest pie may have a preselected outer circumference. To provide a next larger size pie, an annular pie having an inner diameter similar to the outer diameter of the smaller pie is placed concentrically about the smaller pie. The radial dimension of the different pie portions may be preselected to provide suitable wedge-shaped pieces when cut between the inner and outer crust portions. The dough portion of the pie may be formed by laying down a flat strip of the dough in an annular configuration with the opposite ends of the strip abutting to define a complete 360° means. Alternatively, the annular arrangement may be cut from a flat sheet of dough.

The dough may be laid down originally in a thickness greater than the desired final dough thickness and compacted as desired. In the compaction of the dough, one or more of the edge crust portions may be left uncompacted as desired. Further, the uncompacted edge portions may be effectively formed by use of a forming grooved roller in the compacting operation.

The annular dough portions may be used immediately upon formation thereof in forming a completed pizza pie by adding the desired topping and effecting a conventional baking operation. Alternatively, the formed annular dough portion may be stored as by freezing for subsequent use, with or without the topping being added prior to the freezing.

The pie may be purveyed in the form of a plurality of concentric sections with the user being free to use selectively one or more of the sections as desired at a given time.

Thus, the present invention comprehends an improved pizza pie and method of forming the same which is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a plan view of a pizza pie embodying the invention;

FIG. 2 is a perspective view illustrating one method of forming the dough portion thereof;

FIG. 3 is a perspective view illustrating another method of forming the dough portion thereof;

FIG. 4 is a vertical section illustrating a compacting step in the forming thereof;

FIG. 5 is a vertical section illustrating another method of forming the dough portion thereof;

FIG. 6 is a plan view of a pizza pie embodying the invention adapted to be disposed concentrically about a smaller pizza pie embodying the invention such as illustrated in FIG. 1;

FIG. 7 is a plan view of a two-piece pizza pie utilizing the individual pie portions of FIGS. 1 and 6;

FIG. 8 is a plan view of the pizza pie of FIG. 6 illustrating a modified cutting of the pie;

FIG. 9 is a perspective view of a cut pie portion;

FIG. 10 is a schematic vertical section illustrating one method of compacting a mid-portion of the pie dough portion;

FIG. 11 is a schematic vertical section illustrating a modified method of compacting a mid-portion of the pie dough portion;

FIG. 12 is a schematic vertical section illustrating another method of compacting a mid-portion of the pie dough portion; and FIG. 13 is a schematic vertical section illustrating a further method of compacting a mid-portion of the pie dough portion.

DESCRIPTION OF THE PREFERRED EMBODIMENT

In the exemplary embodiment of the invention as disclosed in the drawing, a pizza pie generally designated 10 is shown to include a dough portion 11 carrying a topping 12. Dough portion 11 may be formed of conventional pizza pie dough and topping 12 may comprise any suitable pizza pie topping such as that formed of cheese, sausage, mushrooms, green peppers, anchovies, etc. Pizza pie 10 provides an improved product in having an inner annular edge crust portion 13 defined by a central hole 14 in dough portion 11. The outer circumference of the pizza pie is defined by an outer edge crust portion 15.

The baked pizza pie may be cut into wedge-shaped sections, or pieces, 16, which, as illustrated in FIG. 9, include an outer edge crust portion 16a and an inner edge crust portion 16b. The radial dimension of the annular pizza pie may be preselected so that the radial length of portion 16 is suitable for serving without separation transversely.

As shown in FIG. 6, the invention further comprehends providing such a pizza pie having a relatively large diameter central hole 17 to define a pizza pie 18 adapted to cooperate with pizza pie 10 in forming a composite larger pizza pie such as pizza pie 19. Thus, the diameter of opening 17 of pie 18 may be similar to the outer diameter of pie 10 so that when pie 18 is disposed concentrically about pie 10, the composite structure effectively defines a single large diameter pizza pie.

Thus, pizza pie 18 is similar to pizza pie 10 in having an inner edge crust portion 20 and an outer edge circumferential crust portion 21. Resultingly, pizza pie 18 may be cut between the inner and outer crust portions in forming the separate serving pieces 22 so as to provide an outer edge crust portion 22a and an inner edge crust portion 22b.

Alternatively, as illustrated in FIG. 8, the cuts 23 between crust portions 22a and 22b may be preselected to define both inwardly narrowing and outwardly narrowing pieces 22 and 24, respectively. As shown in FIG. 8, the pizza pie 19 may be cut to form an alternate selection of pieces 22 and 24.

Pizza pie 19 may be baked as a single large diameter pizza, or the portions 10 and 18 thereof may be separated for individual baking as desired. Thus, for example, the housewife may purchase a large pizza pie 19, and if it is decided that only a portion of the pie is to be baked for a given meal, she may use only the outer pie portion 18, leaving the inner pie portion for subsequent use as desired. The pie pieces 16 and 22 are generally similar in that each is defined as by a wedge-shaped configuration having edge crust portions at the inner and outer ends of the wedge shape.

As will be obvious to those skilled in the art, any number of concentric pizza pies may be used in forming a large composite pizza pie.

The invention further comprehends forming such annular pizza pies by a number of different improved methods. Thus, as shown in FIG. 2, the dough portion 11 may be laid down in an annular arrangement by suitably depositing a strip 25 of suitable dough on a rotating table 26 with the inner edge 27 of the storage space outwardly from the axis of rotation 28 of the table. The strip 25 may have opposite end portions 29 juxtaposed in the completed form of the annular dough configuration so as to define a full 360° configuration.

Alternatively, as shown in FIG. 3, the dough strip 25 may be laid down in the annular configuration by swinging of an extruder 30 about a vertical axis 31 to deposit the dough in an annular configuration on a fixed table 32.

As shown in FIG. 5, the annular dough portion 11 may be formed by laying down a flat sheet 33 of dough and providing cutters 34 vertically reciprocable to cut the sheet into successive annular elements 35 with the center portion 36 removed by suitable means such as plunger 37. The sheet 33 may be formed by a suitable extruder 38 or other means as desired.

Dough strip 25 may be laid down with a thickness greater than that desired in the final dough portion 11. Thus, as shown in FIG. 4, a compacting roller 39 may be utilized to reduce the thickness and densify the dough where a thin dough portion of the pizza is desired.

As shown in FIG. 10, roller 39 may have a length slightly less than the radial dimension of the annular dough portion 11 and, thus, the edge crust portions 13 and 15 may remain uncompacted for improved edge crust formation. As illustrated in FIG. 11, the roller 39 may be disposed asymmetrically of the circumferential centerline of the annular dough portion 11 so as to leave only one edge crust portion uncompacted.

As shown in FIG. 12, the uncompacted edge portions 40 and 41 may be formed by providing suitable grooves 42 in the roller. As further shown in FIG. 13, where it is desired to provide only a single uncompacted, but formed, edge crust portion, the roller may be provided with a single annular groove 43. As illustrated in FIGS. 11 and 13, where only a single edge crust portion is uncompacted, it may comprise either the inner or outer edge crust portion of the pizza pie as desired.

Not only does the provision of the edge crust portions at both the inner and outer annular edges of the pizza pie provide an improved pizza serving portion, as discussed above, but further, the exposure of the dough at these portions permits a more rapid baking of the pie. Thus, facilitated provision of custom made pizza pies is obtained providing a substantial advantage over the conventional pizza pies.

As discussed above, the dough portion 11 may be stored as a partially completed product for subsequent use when desired as by freezing thereof. As indicated above, the dough portions may similarly be stored as two sections of a larger diameter pizza pie such as illustrated in FIG. 7. As the larger diameter pizza pie is made up effectively of two readily separable sections, the user is provided with substantial flexibility in the use of the pizza pie, particularly where the pie is obtained in uncompacted form.

The foregoing disclosure of specific embodiments is illustrative of the broad inventive concepts comprehended by the invention.

I claim:

1. A pizza pie having a dough portion and a topping, said dough portion having a central hole defined by an annular inner upwardly extending edge crust portion, an outer circumferential upwardly extending edge crust portion, and a compacted mid-portion extending between said edge portions.

2. The pizza pie of claim 1 having a dough portion comprising an annular dough extrusion having end portions juxtaposed to define a substantially full 360° annular portion.

3. The pizza pie of claim 1 divided into sections arranged in an alternating succession of sections narrowing toward said inner crust portion and sections narrowing toward said outer crust portion.

4. A pizza pie including an inner, first pie portion having a dough portion and a topping, said dough portion having a central hole defined by an annular inner upwardly extending edge crust portion and an outer circumferential upwardly extending edge crust portion, and an outer, second pie portion having a dough portion and a topping, said dough portion having a central hole defined by an annular inner upwardly extending edge crust portion having an inner diameter similar to the outer diameter of outer crust portion of said first pie portion, and an outer circumferential upwardly extending edge crust portion, said pie portions cooperatively defining effectively a single large diameter pizza pie having four concentric crust portions, said pie portions being separable when desired for use selectively as individual annular pizza pies.

5. The pizza pie of claim 4 wherein the radial extent of each of said pie portions is similar.

6. The pizza pie of claim 4 wherein said inner crust portion of the second pie portion abuts the outer crust portion of the first pie portion.

7. The method of forming the dough portion to be used in the formation of a pizza pie comprising: forming the dough in a flat annular configuration defining radially inner and outer edge portions; compacting the mid-portion of the flat dough between said edge portions to provide a compacted pizza pie dough portion having uncompacted upwardly projecting inner and outer edge portions; and baking said dough to cause said edge portion to define inner and outer crusts for facilitated handling of a cut portion of the baked product.

8. The method of forming the dough portion of a pizza pie of claim 7 wherein the dough is compacted by moving a roller against the flat dough.

9. The method of forming the dough portion of a pizza pie of claim 7 wherein the compacting of the dough comprises the steps of providing a roller having a coaxial annular groove, and moving the roller against the flat dough with an edge portion of the dough aligned with said groove to compact a mid-portion of the dough while leaving said edge portion uncompacted to define an uncompacted one of said upwardly projecting crust portions of the pizza pie.

10. The method of forming the dough portion of a pizza pie of claim 7 wherein the compacting of the dough comprises the steps of providing a roller having a pair of coaxial annular grooves, and moving the roller against the flat dough with the inner and outer edge crust portions of the dough aligned respectively with said grooves to compact a mid-portion of the dough while leaving each of said edge portions uncompacted to define said upwardly projecting crust portions of the pizza pie.

* * * * *